United States Patent Office 3,398,572
Patented Aug. 27, 1968

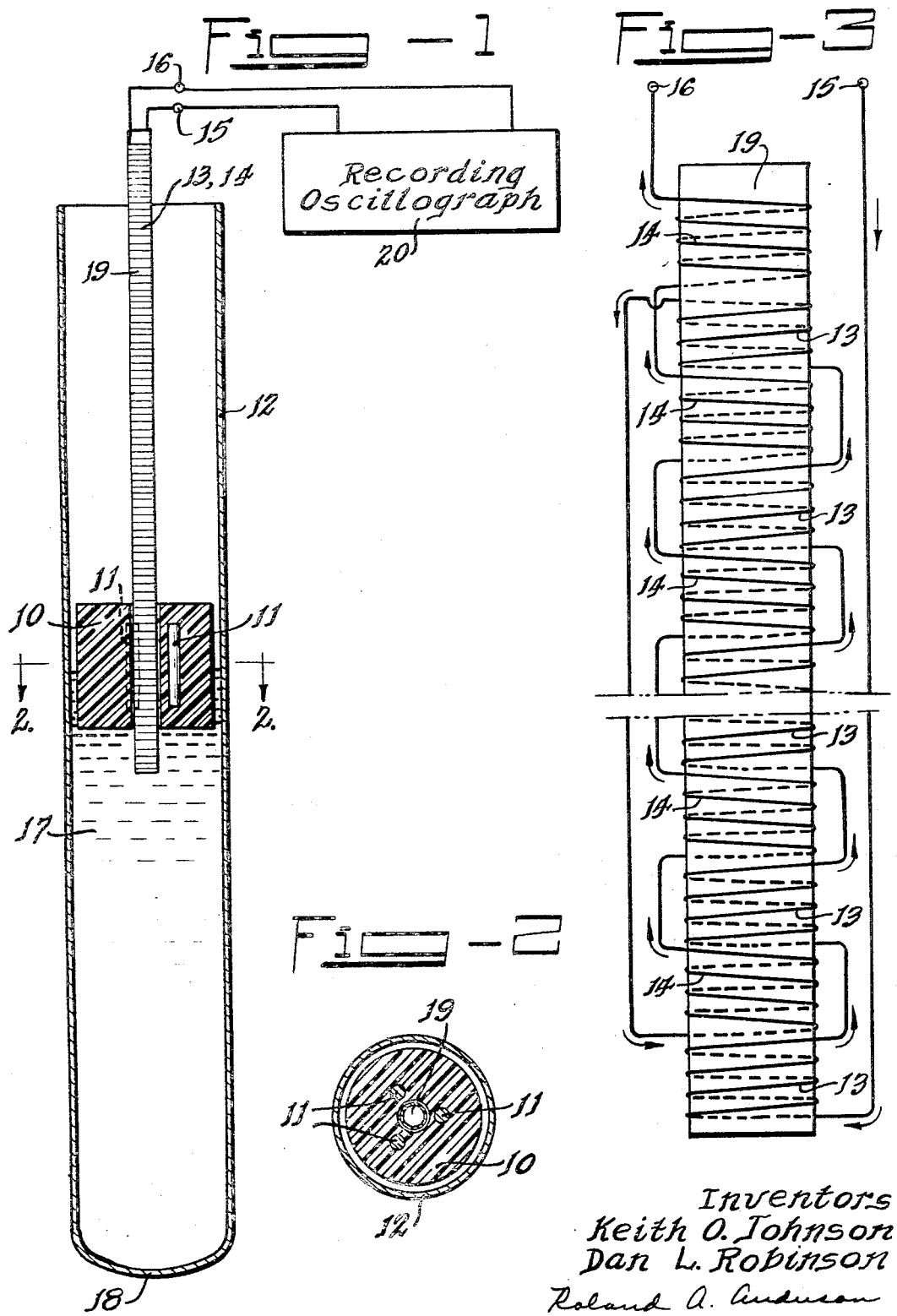

3,398,572
TRANSDUCER FOR MEASUREMENT OF TRANSIENT VELOCITIES
Keith O. Johnson and Dan L. Robinson, Idaho Falls, Idaho, assignors to the United States of America as represented by the United States Atomic Energy Commission
Filed Feb. 20, 1967, Ser. No. 618,283
3 Claims. (Cl. 73—12)

ABSTRACT OF THE DISCLOSURE

An apparatus for measuring rapid transient velocities of liquids in a restricted passage from rest consisting of a float having permanent magnets embedded in it, which is slidably mounted on a rod wound with a series of coils of opposite polarity so that rapid movement of the liquid will cause corresponding movement of the float containing the magnets along the rod, the magnets inducing an alternating electrical current in the coils, the frequency of the current is directly proportional to the transient velocity of the liquid.

*Contractual origin of the invention*

The invention described herein was made in the course of, or under, a contract with United States Atomic Energy Commission.

*Background of the invention*

A number of instruments are available for measuring the flow of liquids through a restricted passage. One group, known as head meters, operates by measurement of the pressure differential or head across a suitable restriction to flow in the pipe line.

Another group of instruments, generally classified as area flowmeters, operates either to raise a weighted plummet in an upright tapered tube or to raise a piston accurately fitted inside a sleeve to uncover sufficient port area in the sleeve to permit passage of the flow.

While both these groups of instruments can provide accurate measurements of liquid flow and can be used to determine velocity variances, none of these instruments by their nature has a sufficiently rapid response time to be of value in the measurement of rapid transient liquid velocities such as a water hammer which might be caused by an explosion or by the rapid generation of steam within a closed system.

We have invented a device for measuring rapid transient velocities of liquids with a high degree of accuracy.

*Summary of the invention*

The apparatus of the present invention comprises a float, permanent magnets attached to the float, and a line of coils. The float is positioned in a pipe and moves with the surface of a liquid whose speed through the pipe is to be measured. The coils are arranged along the pipe. As the liquid, moving rapidly through the pipe, carries along the float, the permanent magnets move along the coils causing them to transmit an alternating-current output signal across output terminals between which the coils are serially connected. The frequency of the output signal indicates the speed of the liquid through the pipe.

*Brief description of the figures*

FIG. 1 is a longitudinal sectional view showing the application of the apparatus of the present invention to a pipe;
FIG. 2 is a transverse sectional view taken on the line 2—2 of FIG. 1; and FIG. 3 is a schematic view of the coil windings of the present apparatus.

As shown in FIGS. 1 and 2, a float 10 and permanent magnets 11 embedded therein are adapted to move in a pipe 12 along a line of coils 13, 14 arranged along the pipe 12. The magnets 11, in moving along the coils 13 and 14, cause them to transmit an alternating current signal across output terminals 15 and 16, between which the coils 13 and 14 are connected in series. The frequency of the output signal indicates the speed of the float 10 and magnets 11 in the pipe 12.

The float 10 and magnets 11 float on liquid 17 in the pipe 12. Rapid movement of the float 10 and magnets 11 may be produced by rapid movement of the liquid 17 upwardly through the pipe 12, for example, in response to an explosive force supplied at a lower end 18 of the pipe 12. Thus, the frequency of the signal at the output terminals 15 and 16 will be a measure of the speed of the liquid 17 in the pipe 12. The float 10, which is formed of a polyethylene cylinder, has a central opening receiving the coils 13 and 14 and a tubular aluminum rod 19 on which the coils 13 and 14 are wound and from which they are insulated. The rod 19 extends in the pipe 12 along the axis thereof and provides a slidable mounting for the float 10. As shown in FIGS. 1 and 2, the permanent magnets 11 are three in number, are spaced 120° from one another about the central opening in the float 11, and extend longitudinally of the pipe 12.

As shown in FIG. 3, coils 13 are wound in one direction on the rod 19 and alternate along the rod 19 with the coils 14, which are wound in the opposite direction on the rod 19. The connection through coils 13 and 14 across the output terminals 15 and 16 proceeds as indicated by the arrows, from the terminal 15 at one end of the rod 19 to the opposite end thereof, thence through only the coils 13 in a direction from the said opposite end of the rod 19 to the said one end thereof, thence to the said opposite end of the rod 19, and thence through only the coils 14 in a direction from the said opposite end of the rod 19 to the said one end thereof to the output terminal 16. As the magnets 11 move past the coils 13, the signal across the output terminals 15 and 16 has a polarity in one direction. As the magnets 11 move past the coils 14, the signal has an opposite polarity. This difference in polarity of signal is due to the fact that the coils 13 and 14 are oppositely wound and that in the path from terminal 15 to terminal 16 through coils 13 and 14 there is the same direction of movement along the rod 19.

The output signal at terminals 15 and 16 can be recorded in a recording oscillograph 20.

As previously described, the liquid 17 is propelled upwardly in the pipe 12 by an explosive force supplied at the lower end 18 of the pipe 12. The intended use for the device of the present invention is to determine the amount of mechanical energy that is generated in a water in a nuclear reactor as a result of fuel-element failure. Actual tests were carried out in which an explosive was set off at the lower end 18 of the pipe 12.

In tests, the aluminum rod 19 was 20 inches long and ½ inch in outer diameter. Although aluminum was used, any material having the same electro-magnetic characteristics would be satisfactory for the operation of the invention. Although the float 10 was of polyethylene, any suitable material would be satisfactory. However, to make a valid measurement, the density of the float 10 should be adjusted to match that of the liquid, and the acoustical characteristic impedance should approximate that of the liquid. Proper float material selection can essentially eliminate inertial effects of the transducer and will allow measurement of velocity changes with rise times at least as short as 300 μsec.

Once the period of alternating output is known, which can be obtained from the recording device attached to the magnetic sensing device, the velocity of the liquid can be determined from the following formula:

$$V = 2d/T$$

where $V$ = velocity
$d$ = distance between coil winding reversal,
$T$ = period of alternating output.

In addition, since polarity of the output signal reverses with every coil winding reversal, the liquid level as a function of time may be obtained from the following:

$$x = x_0 + 2dn$$

where $x$ = liquid level at a given time,
$x_0$ = initial liquid level,
$d$ = distance between coil winding reversal,
$n$ = number of cycles of the alternating output to the given time.

Results from water velocity transducer tests are given below. The polyethylene float 10 was 2 inches long and 1.87 inches in outer diameter, and containing three permanent magnets 1 inch long spaced 120° apart. The rod 19 was wound for 16 inches of its length with coils 13 and 14, each of which was ½ inch in length and consisted of 20 turns. Water velocity was supplied by exploding 1 gram of black powder and velocity of the float was measured over 16 inches of travel. The pressure of the explosion was measured, using a bonded-strain-gage pressure transducer. Results of the tests are given in the table below together with a comparison of the momentum of the water slug (the average velocity over 16 inches of travel times the mass of water above the explosive) with the momentum as determined from the pressure transducer (the integral of the pressure pulse times the inside cross-sectional area of the capsule).

RESULTS FROM WATER VELOCITY TRANSDUCER TESTS

| Test No. | Maximum velocity (ft./sec.) | Average velocity (ft./sec.) | Momentum from velocity transducer (slug ft./sec.) | Momentum from pressure transducer (slug ft./sec.) | Kinetic energy in water slug (ft.-lbs.) |
|---|---|---|---|---|---|
| 1 | 133 | 128 | 8.9 | 10.5 | 670 |
| 2 | 136 | 126 | 10.7 | 10.6 | 670 |
| 3 | 104 | 99 | 8.4 | 10.1 | 500 |
| 4 | 95 | 89 | 7.5 | 8.2 | 365 |
| 5 | 142 | 132 | 11.2 | 12.8 | 845 |
| 6 | 144 | 136 | 11.5 | 12.6 | 855 |
| 7 | 169 | 113 | 9.6 | 8.9 | 505 |
| 8 | 156 | 138 | 11.7 | 12.3 | 850 |
| 9 | 157 | 108 | 10.8 | 11.5 | 620 |
| 10 | 125 | 106 | 10.5 | 11.4 | 610 |

It is to be understood that the invention is not to be limited to the details given herein but that it may be modified within the scope of the appended claims.

The embodiments of the invention in which an exclusive property or privilege is claimed are defined as follows:

1. A device for measuring velocity of liquid in a pipe, said device comprising
    a float positioned in the pipe and being responsive to movement of the liquid in the pipe,
    a permanent magnet attached to the float,
    a pair of output terminals,
    and a plurality of coils connected in series across the output terminals and extending along the pipe, the coils being divided into two groups, the coils of one group alternating along the pipe with the coils of the other group, each coil of the said one group being arranged and connected with the output terminals so as to transmit an output signal of a given polarity across the output terminals in response to movement of the magnet past the coil in one direction along the pipe, each coil of the said other group being arranged and connected with the output terminals so as to transmit an output signal of the opposite polarity across the output terminals in response to movement of the magnet past the last mentioned coil in the said one direction along the pipe.

2. The device specified in claim 1 and further comprising
    a rod and
    two additional permanent magnets,
    the rod being positioned within the pipe and extending along the axis thereof and serving as a mounting for the coils,
    the permanent magnet of claim 1 and said two additional permanent magnets being embedded in the float and distributed in spaced relation to one another about the rod,
    the float having a central opening receiving the rod and being slidably mounted thereon.

3. The device specified in claim 2, all the coils of one group being wound in one direction, all the coils of the other group being wound in the opposite direction, the connection from one terminal to the other terminal through the coils proceeding only by way of the coils of the said one group in one direction along the rod and thence only by way of the coils of the second group in the same direction along the rod.

References Cited

UNITED STATES PATENTS

| 2,696,105 | 12/1954 | Mackas | 73—49.4 X |
| 3,254,524 | 6/1966 | Tannenberg | 73—12 |
| 3,242,718 | 3/1966 | Berger et al. | 73—398 X |
| 3,336,807 | 8/1967 | Van Lint et al. | 73—398 |

OTHER REFERENCES

Clouston et al.: "A Bolometer Detector for the Measurement of Shock Velocity in Low Density Gases," Journal of Scientific Instruments, August 1957, vol. 34, pp. 321–324.

RICHARD C. QUEISSER, *Primary Examiner.*

E. D. GILHOOLY, *Assistant Examiner.*